United States Patent [19]

Chart

[11] 4,442,182

[45] Apr. 10, 1984

[54] ONE-PIECE, COMPOSITE ELECTRICAL CONNECTOR

[75] Inventor: John E. Chart, Edinboro, Pa.

[73] Assignee: Teledyne Penn-Union, Edinboro, Pa.

[21] Appl. No.: 382,154

[22] Filed: May 26, 1982

[51] Int. Cl.[3] ........................ H01R 11/00; H02G 15/00

[52] U.S. Cl. ........................................ 428/654; 428/675; 428/680; 148/127; 339/278 C

[58] Field of Search ............... 428/650, 675, 678, 652, 428/654, 680; 148/127; 339/278 C, 276 T, 276 C; 29/879; 174/68 A, 84 C

[56] References Cited

U.S. PATENT DOCUMENTS

| | | | |
|---|---|---|---|
| 2,806,215 | 9/1957 | Redslob | 339/275 T |
| 2,954,600 | 10/1960 | Schiffmann | 339/278 C |
| 3,233,211 | 2/1966 | Smith | 339/275 R |
| 3,475,816 | 11/1969 | Willoughby | 29/879 |
| 3,560,911 | 2/1971 | Zimmerman | 339/278 C |
| 3,568,130 | 3/1971 | Hurst | 339/276 T |
| 3,732,528 | 5/1973 | Vetter | 339/276 T |
| 3,828,706 | 8/1974 | Scott | 29/879 |
| 3,876,280 | 4/1975 | Jones | 339/276 T |
| 3,912,358 | 10/1975 | Miller | 339/276 T |
| 3,998,520 | 12/1976 | Zemels | 339/276 T |
| 4,039,244 | 8/1977 | Leachy | 339/275 T |
| 4,210,381 | 7/1980 | Borgstrom | 339/276 T |
| 4,290,665 | 9/1981 | Krasnov | 29/879 |

FOREIGN PATENT DOCUMENTS

| | | | |
|---|---|---|---|
| 23880 | 2/1981 | European Pat. Off. | 339/278 C |
| 1108263 | 1/1956 | France | 339/278 C |
| 1431219 | 4/1946 | United Kingdom | 339/278 C |

OTHER PUBLICATIONS

*Metal Progress,* "Nickel and Nickel Alloys", pp. 110–111, Mid-Jun. 1978.

*Metals Handbook,* 9th ed. American Society for Metals, Ohio, vol. 2-pp. 29–30, 256–257, vol. 4, pp. 675–683, Nov. 1979.

*Primary Examiner*—L. Dewayne Rutledge

*Assistant Examiner*—John J. Zimmerman

*Attorney, Agent, or Firm*—Trexler, Bushnell & Wolters, Ltd.

[57] ABSTRACT

A one-piece, composite electrical connector is disclosed. The connector is fabricated from at least two portions of electrically conductive metals.

15 Claims, 7 Drawing Figures

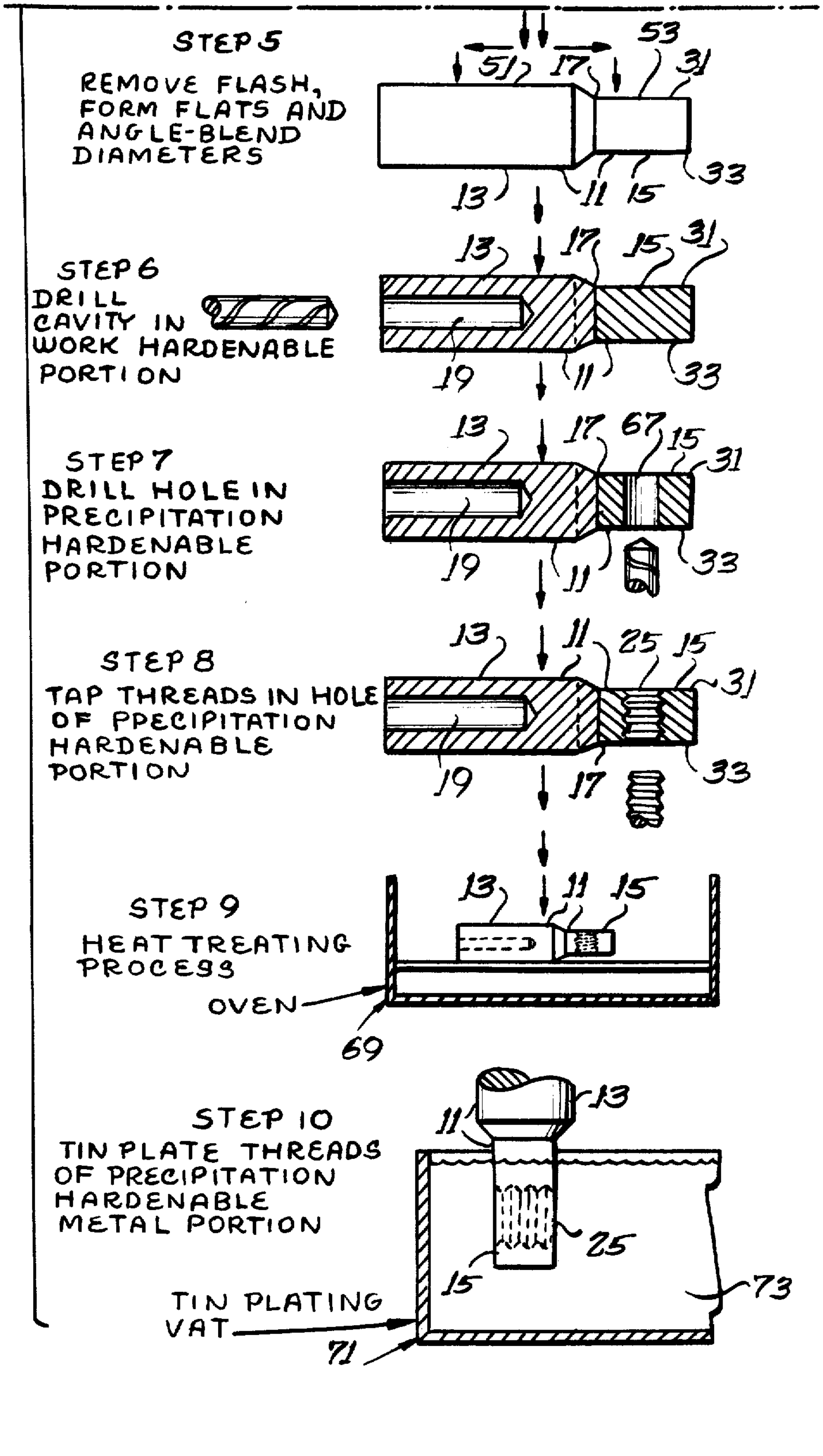
STEP 5
REMOVE FLASH, FORM FLATS AND ANGLE-BLEND DIAMETERS
51
17
53
31
13
11
15
33
STEP 6
DRILL CAVITY IN WORK HARDENABLE PORTION
19
STEP 7
DRILL HOLE IN PRECIPITATION HARDENABLE PORTION
67
STEP 8
TAP THREADS IN HOLE OF PPECIPITATION HARDENABLE PORTION
25
STEP 9
HEAT TREATING PROCESS
OVEN
69
STEP 10
TIN PLATE THREADS OF PRECIPITATION HARDENABLE METAL PORTION
TIN PLATING VAT
71
73

ONE-PIECE, COMPOSITE ELECTRICAL CONNECTOR

BACKGROUND OF THE INVENTION

The present invention relates to an electrical connector usable with a variety of electrical devices. More specifically, the present invention relates to a composite, one-piece electrical connector having an end which is crimpable and another end which is suitable for a mechanical connection.

Electrical connectors are devices designed to mechanically connect together electrical components. An electrical connector is not limited to any one engineering design, but rather, based on desired features, can take on any one of a variety of shapes and designs.

One conventional type of an electrical connector, is used to connect flexible insulated electrical conductor wires or cables to the terminals of electrical devices such as transformers. Such a connector is commercially manufactured having a crimpable end and another end which is suitable for mechanical connection. The crimpable end generally contains a cavity designed to accommodate a conductive portion of the electrical conductor wire. The end suitable for mechanical connection generally contains a threaded hole designed to accommodate a threaded electrical device such as a probe portion of a transformer. The connector hole, which need not be threaded, usually extends transversely into one end of the connector. The connector cavity, located at the other end of the connector, is usually cylindrical in shape. The cavity usually has an axis which is substantially co-linear with the connector axis, and the cavity usually extends into the body of the connector sufficiently far to accommodate an effective length of a conductive portion of the conductor wire.

The above-mentioned probe is usually made of a metal alloy which is almost always different from the metal alloy which makes up the conductive portion of the conductor wire. For example, present economics dictate that these conductive portions of conductor wire are usually made of aluminum or aluminum alloys. However, the probe is generally made of copper or copper alloys because the probe usually must make contact with a receptacle or terminal, generally made from copper or copper alloys.

Those skilled in the art know that a composite terminal, made of dissimilar metal alloys metallurgically bonded together along a bonding interface, is susceptible to undesirable metallic diffusion or formation of intermetallic compounds at the bonding interface when the composite terminal is heated to elevated temperatures. Moreover, an additional problem that can result is severe electrical resistance to current flow, or loss of bond strength, or both along the bonding interface.

It also can be appreciated by those skilled in the art that during its course of operation, the conventional connector described above can often be subjected to repeated thermal cycles wherein it is caused to alternately heat up and cool off. For example, the connector may heat up to approximately 80 Centrigrade degrees (144 Fahrenheit degrees) above its surrounding temperature before it cools off. This thermal cycle is an important design consideration for electrical connectors because aluminum (or aluminum alloys) and copper (or copper alloys) have different coefficients of thermal expansion. As such a connector experiences such a thermal cycle, stresses build up with the result being that an electrical failure may be induced either in the hole-containing end where the probe makes contact or in the cavity-containing end where the conductive portion of the conductor wire makes contact. Therefore, to avoid thermally-induced electrical failures in such a type of conventional connector, it is desirable to mechanically affix the probe and the conductive portion of the conductor to the connector.

Such a conventional connector, therefore, should be sufficiently hard at one end to receive a probe portion, usually threaded, and it should be sufficiently soft at the other end to be crimpable over a conductive portion of a conductor wire. Such a conventional connector also should be able to function well in a thermally cycling course of operation.

In such a conventional connector, the end having the transverse hole is usually made of a hard or hardenable metal alloy because it is undesirable to have metal deformation take place in the hole-containing end of the connector as a result of thermally induced stresses. Also, because it is desirable to crimp the cavity-containing end after an effective length of the conductive portion of an electrical conductor has been inserted within the cavity, the end of such a conventional connector (having a cylindrical cavity) is usually made of a soft or softenable metal alloy. Currently manufactured one-piece, connectors present a compromise situation with respect to selection of a desired combination of mechanical properties suitable for a crimpable end and for a mechanical connection end. If the connector is made entirely of one relatively soft malleable metal or one metal alloy suitable for crimping, unacceptable deformation and eventual failure will occur at the hole-containing end of the connector. If the metal or alloy is entirely hard, unacceptable build-up of a highly electrically resistant film and eventual failure will occur at the cavity-containing end of the connector.

One attempt to meet materials of construction demands of electrical connectors has resulted in a patent (U.S. Pat. No. 3,876,280) being issued for a bimetallic connector, fabricated from dissimilar metals. This patent specifically teaches that dissimilar metals must be used and contemplates a special process for joining such dissimilar metals. This process relies upon a solid state bonding process to join the two dissimilar metals together and thus presents several production line problems. For example, the solid state bonding process requires that, prior to being joined together along a bonding interface, the dissimilar metals have an extremely flat surface and be extremely clean. Fine grinding techniques have to be used to achieve these flat surfaces. In addition, the solid state bonding process requires that the metals be joined together, at their bonding interface, no more than five minutes after having been finely ground and cleaned. These requirements put undue strain upon most conventional bimetallic connector manufacturing processes.

It is an object of the present invention to provide a novel, one-piece, composite electrical connector having one end portion which is relatively soft and crimpable and another end portion which is relatively hard and suitable for mechanical connection.

It is also an object of the present invention to provide a novel, one-piece, composite electrical connector as set forth above which can be manufactured using conventional welding techniques.

Other objects and advantages of the present invention will become apparent from the following description and accompanying drawings.

SUMMARY OF THE INVENTION

In accordance with the objects of the present invention, it has been discovered that a one-piece, composite electrical connector can easily be manufactured. Because many of the metal alloys used to fabricate the composite connectors of the present invention are somewhat similar in composition, no appreciable quantities of harmful intermetallic compounds form at the bonding interface thereof. Because many of the metal alloys used to fabricate the composite connectors of the present invention have critically different physical properties, the physical characteristics of the end portions of the composite connector are markedly different. For example, one end of the composite connector of the present invention is relatively soft and crimpable, the other end is relatively hard and suitable for mechanical connection. Because the composite connector of the present invention is hard at the mechanical connection end, mechanical failures stemming from metal deformation are eliminated; and because the connector is soft and crimpable at the other end, so are failures traceable to build-up of the highly electrically resistant film mentioned above. Also because the metal alloy portions used to fabricate composite electrical connectors of the present invention are somewhat similar in composition, the two end portions of the composite connector of the present invention can easily be bonded together using conventional welding techniques.

Moreover, casting techniques can be used to manufacture the composite connector of the present invention when at least one of the connector portions is a casting alloy. In this procedure, the other (non-cast) connector portion can be inserted into a casting mold, and the cast-metal connector portion can then be introduced into the mold.

It is also possible to use powder metallurgy processing techniques to manufacture the composite connector of the present invention, if the material compositions of the composite connector are compatible with such techniques. Using these techniques, for example, discrete amounts of different compositions, each composition used to make an individual portion of a composite connector, can be placed in a die cavity in a manner such that intermixing does not occur. The compositions can then be pressed and sintered in the usual manner to produce a part having desired physical characteristics and composition.

The one-piece, composite electrical connector of the present invention greatly simplifies electrical connector manufacturing. A presently preferred method of manufacturing the one-piece, composite electrical connector of the present invention can be illustrated by the following manufacturing sequence (Example 1) which uses one end portion made of a precipitation hardenable metal alloy and another end portion made of a work hardenable metal alloy to make a one-piece, composite connector. For the soft portion of the connector, a work hardenable metal which has been pre-shaped into a rod, is used. For the hard portion, a precipitation or thermally hardenable metal which also has been pre-shaped into a rod, is similarly used. The rod of the work hardenable portion preferably has a slightly larger diameter than the rod of the thermally hardenable portion so that roundness of the fabricated connector can be maintained after the two portions have been welded together and the welding flash removed.

EXAMPLE 1

The following represents one commercially available method of manufacturing the composite, one-piece electrical connector of the present invention. The connector comprises two metal alloy portions. One of the metal alloy portions is made of a work hardenable metal, the other of the metal alloy portions is made of a precipitation hardenable metal.

1. For each of the metal portions, an appropriate length of metal alloy is cut to make a metallic slug. For example, each of the metallic slugs of appropriate length can be cut from round rod.

2. Each of the metallic slugs is prepared for conventional bonding. For example, each of the metallic slugs can be ground or otherwise formed in a conventional manner to have a chisel edge (of about 120° of included angle) on one end.

3. Each of the metallic slugs is secured in a conventional bonding machine. For example, in a resistance butt welding machine of known construction, the resistance butt welding machine having two dies, wherein the dies are oriented to face each other, in one of the dies, one of the metallic slugs made of the work hardenable metal can be secured and in the other of the dies, the other of the metallic slugs made of the precipitation hardenable metal can be secured. The metallic slugs are oriented substantially co-linearly in a fashion such that the chisel-edge ends of each of the metallic slugs are facing, but such that each of the chisel edges are perpendicular. Such a substantially co-linear orientation of the metallic slugs defines an axis of the one-piece, composite electrical connector.

4. Conventional techniques are used to bond the metallic slugs together. For example, when using the resistance butt welding machine in the conventional manner, wherein electrical current is used and axial pressure is applied, some metal melting of the metal slugs will occur and a welding flash will appear at a region where the chisel edges meet.

5. Commercially available machinery is used to further prepare the crimpable end portion, the end portion suitable for mechanical connection or both end portions. For example, take the metallic slugs now conventionally bonded together, and after performing any post-bonding procedures, if any of such post-bonding procedures are necessary, use commercially available machinery to form a cavity in the metallic slug made of the work hardenable metal and to form appropriate mechanical attachment means at the other metallic slug made of the precipitation hardenable metal. Then, the metallic slugs, now conventionally bonded together, are next fashioned into one working example of the one-piece, composite electrical connector of the present invention. For example, when using conventional bonding techniques wherein removal of the flash is required, the flash can be removed and appropriate, suitable mechanical connection such as machining can be performed at the region where the chisel edges meet until the one-piece, electrical connector is satisfactorily round along the axis of the one-piece connector. Then, in the end of the work hardenable metal portion, the cavity can be formed by end drilling or machining, the cavity having appropriate cylindrical geometry and an axis which is appropriately co-linear with the axis of the composite connector. Into the precipitation hardenable metal portion, a hole can be end-drilled or machined, the hole having a cylindrical geometry and an axis which is approximately transverse to the axis of the one-piece, composite electrical connector, the hole later being tapped and threads cut therewithin if such tapping and threading is desirable.

6. The working example of the one-piece, composite connector of the present invention is subjected to a commercially available, pre-determined heat treating process. For example, a purpose of the heat treating process can be to soften the work hardenable metal portion, to increase hardness of the precipitation or thermally hardenable metal portion, or both. Means to accomplish the heat treating process can be a continuous furnace. Then, achieving desired results, the heat treating process is terminated. For example, the heat treating process can be terminated when the work hardenable metal portion achieves a desired softness, when the precipitation hardenable metal portion achieves a desired hardness, or after a sufficient passage of time.

7 Post-heat-treatment procedures are performed, if any such procedures are deemed desirable. For example, the working example of the one-piece, composite electrical connector of the present invention can have the threads of the hole-containing-end tin-plated or otherwise coated at an outer surface of the threads to minimize surface oxidation or build-up of electrically resistant film during electrical use.

It can be appreciated that steps 1 through 10 in FIG. 7 are exemplary in nature and that the one-piece, composite electrical connector of the present invention could have been shown having a cavity formed in the work hardenable portion essentially transverse in orientation to the axis of the connector or could have been shown having a crimpable end portion comprising side wings which are reversibly bendable upon the conductive portion of the electrical conductor wire, formed at the work hardenable metal alloy portion. Or, at the precipitation hardenable metal alloy portion, an appropriate length of end portion could have been machined to provide an outwardly extending, integrally formed, cylinder at the very end of the portion, the cylinder defining an axis substantially co-linear with the axis of the one-piece, composite electrical connector, with the cylinder threaded to provide integral, male-threaded mechanical attachment means. These examples are by no way intended to limit the scope of the one-piece, composite electrical connector of the present invention.

In addition to the above-presented example (Example 1), it can be appreciated that any conventionally available manufacturing method, incorporating such welding processes as oxyacetylene, arc, MIG, TIG, or resistance can be used to produce the one-piece, composite electrical connector of the present invention.

In the above example (Example 1), the soft end of the finished one-piece, composite connector of the present invention can have a hardness value of less than 30 on the Rockwell "H" Scale; and the hard end can have a hardness value of more than 85 on the Rockwell "F" Scale. Those skilled in the art know that these particular values, respectively, are indicative of excellent crimpability and mechanical connection properties. The manufacturing sequence of Example 1 hereby incorporates by reference a one-piece, composite electrical connector initially made from AA 1100-H18 and AA 6061-T6 metal alloy portions, which after processing, has the properties of AA 1100-0 on the crimpable end and of AA 6061-T6 on the mechanical connection end.

The convention of the Aluminum Association (AA) is hereby incorporated by reference to identify specific alloys and to illustrate alloy compositions. In addition, the AA basic temper designations are also hereby incorporated by reference. Thus, in the above-described example (Example 1) of the present invention, the work hardenable metal alloy chosen was Aluminum Association 1100-H18, and the precipitation hardenable metal alloy chosen was Aluminum Association 6061-T6. The 1100-H18 alloy, as starting material for the soft end, describes an aluminum alloy which has been given an AA four-digit alloy number of 1100 and which has been given an AA basic temper designation of H18. The 1100-0 designation, as the finished condition of the crimpable end, describes an aluminum alloy which has been given an AA four-digit alloy number of 1100 and which has been given an AA basic temper designation of 0. The AA alloy number of 1100 means that the alloy is 0.12 percent copper, 0.88 percent impurities and 99.00 percent aluminum. An AA temper designation of H18 has a specific meaning as to the strain-hardened properties of this 1100 alloy, and the AA temper designation of 0 has a specific meaning as to the annealed properties of this 1100 alloy. In a similar manner, the 6061-T6 designation for the hardened end describes an aluminum alloy which has been given an AA four-digit alloy number of 6061 and which has been given the basic temper designation of T6. The AA alloy number of 6061 means that the alloy is made of 0.6 percent silicon, 0.28 percent copper, 1.0 percent magnesium, 0.2 percent chromium, and 97.92 percent aluminum. An AA temper of T6 designation applies either to products which have not been cold worked after solution heat treatment or applies to products in which the effect of cold working (in flattening or straightening) may not be recognized in mechanical property limits.

Ordinarily, a work hardenable metal alloy sufficiently hard that it can be easily machined, drilled or tapped is chosen. Through a heat treating process, however, the work hardenable metal ought to soften to the point where it is easily crimpable, the heat treating process acting as an annealing process.

Ordinarily, a precipitation hardenable metal alloy is chosen such that it increases or maintains its hardness when it is subjected to the above-mentioned heat treating process. This is because the very same heat treating process which serves to harden the precipitation hardenable metal alloy can (and is usually also used to) anneal the work hardenable metal alloy. As will be appreciated by those skilled in the art of precipitation hardening of metal alloys, it is known that upon being subjected to the above-mentioned heat treating process, solute atoms in a matrix lattice of a metal alloy, made up of a solid solution, congregate as a result of statistical fluctuations in the solid solution; solute atoms diffuse from the surrounding matrix to regions rich in solute, and in these solute-rich regions, begin to generate nuclei of a new phase; an intermediate crystal structure then begins to grow in close contact with the solid solution; eventually, a stable equilibrium phase develops; and because of a strain which develops in the matrix lattice of the metal alloy, the alloy thereafter possesses greater hardness.

A number of metal alloys have been joined to make the one-piece, composite connector of the present invention using the bonding method of Example 1. Eight more examples of the one-piece, composite connector of the present invention, numbered 2 through 9, are listed below in Table 1.

TABLE 1

| Example Number | Crimpable End | Mechanical Connection End |
|---|---|---|
| 2 | AA 100.1 | AA 356.0 |
| 3 | AA 1060 | AA 7075 |
| 4 | AA 1100 | AA 6061 |
| 5 | CDA 102 | CDA 182 |
| 6 | CDA 102 | CDA 647 |
| 7 | CDA 801 | CDA 955 |
| 8 | Nickel 200 | Monel Alloy K500 |
| 9 | Nickel 200 | CDA 647 |

Example 2, described as 100.1 following the AA convention, uses an aluminum foundry alloy ingot having a compositional breakdown as shown in Table 2 for the crimpable end, and an aluminum foundry alloy casting, AA 356.0, also shown in Table 2, for the mechanical connection end. Table 2 is presented as follows:

TABLE 2

| AA Alloy Number | Percentage of Alloying Elements in Aluminum (Aluminum and Normal Impurities Constitute Remainder of the Composition) | | | | | | | |
|---|---|---|---|---|---|---|---|---|
| | Silicon | Copper | Manganese | Magnesium | Nickel | Zinc | Titanium | Other |
| 100.1 | 0.15 maximum | 0.10 maximum | | | | 0.05 maximum | | Iron. 0.6 to 0.8; impurities 0.03 maximum each or 0.10 maximum total; manganese and chromium and vandium and titanium totally 0.025 maximum |
| 356.0 | 6.5 to 7.5 | 0.25 maximum | 0.35 maximum | 0.20 to 0.40 | | 0.35 maximum | 0.25 maximum | Iron. 0.6 maximum; impurities 0.05 maximum each or 0.15 maximum total |

The compositional breakdowns of the alloys of Examples 3 and 4 can be found in Tables 8 and 9, which are presented and discussed later.

In addition to the Aluminum Association (AA) number, the Copper Development Association (CDA) and the Nickel and Cobalt Alloy Trade Names are also hereby incorporated by reference to describe the alloy compositions of the following working examples of the one-piece, composite connector of the present invention.

Example 5 uses oxygen-free copper, CDA 102 at the crimpable end and a chromium copper alloy, CDA 182, at the mechanical connection end. Example 6 also uses oxygen-free copper, CDA 102 at the crimpable end, but a silicon-bronze alloy, CDA 647, at the mechanical connection end. Example 7 uses a cast copper, CDA 801, at the crimpable end and a cast aluminum-bronze alloy, CDA 955, at the mechanical connection end. The compositional breakdown of the copper alloys of Examples 5 through 7 are given below in Table 3.

TABLE 3

| CDA Alloy Number | Percentage of Alloying Elements in Copper (Copper and Normal Impurities Constitute Remainder of the Composition) | | | | | | | | |
|---|---|---|---|---|---|---|---|---|---|
| | Silicon | Aluminum | Manganese | Iron | Chromium | Nickel | Zinc | Lead | Other |
| 102 | | | | | | | | | Silver, included in copper matrix; copper 99.95 minimum |
| 182 | 0.10 maximum | | | 0.10 maximum | 0.6 to 1.2 | | | 0.05 maximum | Silver, chromium, iron, lead, silicon included in copper matrix; impurities 0.50 maximum |
| 647 | 0.40 to 0.8 | | | 0.10 maximum | | 1.6 to 2.2 | 0.50 maximum | 0.10 maximum | named elements included in copper matrix; impurities 0.50 maximum |
| 801 | | | | | | | | | silver included in copper matrix; copper 99.95 minimum |
| 955 | | 10.0 to 11.5 | 3.5 maximum | 3.0 to 5.0 | | 3.0 to 5.5 | | | named elements included in copper matrix; impurities 0.50 maximum |

Example 8 uses a commercially pure nickel alloy, Nickel 200, at the crimpable end and a nickel-copper precipitation hardenable alloy, Monel Alloy K500, at the mechanical connection end. The compositional breakdown of the alloys present in Example 8 are given below in Table 4. Example 9 uses Nickel 200 at the crimpable end and CDA 647 at the mechanical connection end. The compositional breakdowns of the alloys present in Example 9 are given below in Tables 3 and 4.

TABLE 4

| Nickel and Cobalt Alloys | Percentage of Alloying Elements in Nickel (Nickel and Normal Impurities Constitute Remainder of the Composition) | | | | | | | | |
|---|---|---|---|---|---|---|---|---|---|
| Trade Names | Silicon | Aluminum | Manganese | Iron | Carbon | Copper | Sulphur | Titanium | Other |
| Nickel 200 | 0.35 maximum | | 0.35 maximum | 0.40 maximum | 0.15 maximum | 0.25 maximum | 0.010 maximum | | Nickel 99.0 minimum |
| Monel Alloy K500 | 0.50 maximum | 2.30 to 3.15 | 1.50 maximum | 2.00 maximum | 0.25 maximum | remainder | 0.01 maximum | 0.35 to 0.85 | Nickel 63.0 to 70.0 |

Example number 1 of the one-piece, composite connector of the present invention was subjected to the NEMA CC-3, 500-cycle, class A, heat cycle test to test it in a thermally cycling environment.

Other examples (Examples 10 through 13) of the one-piece, composite electrical connector of the present invention have been manufactured easily from two work hardenable metal alloys chosen such that one metal alloy portion is substantially harder than the other. See Tables 5 and 6, below. As an example, just such a composite connector (Example 10) can be manufactured easily, using conventional bonding techniques, wherein one metal alloy portion is of CDA 102 and the other metal alloy portion is of CDA 651 where both of these metal alloy portions are in the annealed state and each of these metal alloy portions has a hardness value of about 40 on the Rockwell "F" scale and of about 60 on the Rockwell "F" scale, respectively.

Additionally, other examples (Examples 14 and 15) of the one-piece, composite electrical connector of the present invention have been manufactured easily, using conventional bonding techniques, from two thermally hardenable metal alloys. See Table 7, below.

It is contemplated that the composite connector of the present invention is not limited to the above examples, but can include a wide range of combinations of metals such that one end portion of the connector is work hardenable and the other end portion is thermally or precipitation hardenable. Thus, the following tables (Tables 8 and 9) have been included to demonstrate that various aluminum alloys can be chosen from Table 8, for the crimpable end, and that various other aluminum alloys can be chosen from Table 9, for the mechanically connectable end and that a variety of other working examples of the composite connectors of the present invention can be manufactured from such combinations of aluminum alloys, using conventional welding techniques, if such is desirable.

TABLE 5

| CDA Alloy | Percentage of Alloying Elements in Copper (Copper and Normal Impurities Constitute Remainder of the Composition) | | | | | | | | |
|---|---|---|---|---|---|---|---|---|---|
| Number | Silicon | Aluminum | Manganese | Iron | Chromium | Nickel | Zinc | Lead | Other |
| 220 | | | | 0.05 maximum | | | Remainder | 0.05 maximum | Copper is 89.0 to 91.0 |
| 651 | 0.8 to 2.0 | | 0.7 maximum | 0.8 maximum | | | 1.5 maximum | 0.05 maximum | All named elements included in copper matrix; copper matrix is 99.5 minimum. |
| 706 | | | 1.0 maximum | 1.0 to 1.8 | | 9.0 to 11.0 | 1.0 maximum | 0.05 maximum | Silver and all named elements included in copper matrix; copper matrix is 99.5 minimum. Copper, by itself, is 86.5 minimum. (Composition varies slightly for welded applications.) |

TABLE 6

| Example No. | Two work hardenable metal portions | Comments: |
|---|---|---|
| 10 | CDA 102 bonded to CDA 651 | See Tables 3 and 5 for compositional breakdowns. |
| 11 | CDA 102 bonded to CDA 220 | See Tables 3 and 5 for Compositional breakdowns. |
| 12 | AA 1100 bonded to AA 3003 | See Table 8 for compositional breakdowns. |
| 13 | Nickel 200 bonded to CDA 706 | See Tables 4 and 5 for compositional breakdowns. |

TABLE 7

| Example No. | Two precipitation or thermally hardenable metal portions | Comments: |
|---|---|---|
| 14 | AA 6063 bonded to AA 6061 | See Table 9 for compositional breakdowns. |
| 15 | Monel Alloy K500 bonded to CDA 647 | See Tables 3 and 4 for compositional breakdowns. |

TABLE 8

| AA Alloy | Crimpable End<br>Percentage of Alloying Elements in Aluminum (Aluminum and Normal Impurities Constitute Remainder of the Composition) | | | | | | | | |
|---|---|---|---|---|---|---|---|---|---|
| Number | Silicon | Copper | Manganese | Magnesium | Chromium | Nickel | Zinc | Titanium | Other |
| 1050 or 1350 | | | | | | | | | impurities, 0.50% maximum |

TABLE 8-continued

| AA Alloy Number | Crimpable End: Percentage of Alloying Elements in Aluminum (Aluminum and Normal Impurities Constitute Remainder of the Composition) | | | | | | | | |
|---|---|---|---|---|---|---|---|---|---|
| | Silicon | Copper | Manganese | Magnesium | Chromium | Nickel | Zinc | Titanium | Other |
| 1060 | | | | | | | | | impurities 0.40% maximum |
| 1100 | | 0.12 | | | | | | | impurities 0.88% maximum |
| 1145 or 1345 | | | | | | | | | impurities 0.55% maximum |
| 1175 | | | | | | | | | impurities 0.25% maximum |
| 1200 | | | | | | | | | impurities 1.00% maximum |
| 1230 | | | | | | | | | impurities 0.70% maximum |
| 1235 | | | | | | | | | impurities 0.65% maximum |
| 3003 | | 0.12 | 1.2 | | | | | | |
| 3004 | | | 1.2 | 1.0 | | | | | |
| 3005 | | | 1.2 | 0.40 | | | | | |
| 3105 | | | 0.6 | 0.50 | | | | | |

TABLE 9

| AA Alloy Number | Mechanically Connectable End: Percentage of Alloying Elements in Aluminum (Aluminum and Normal Impurities Constitute Remainder of the Composition) | | | | | | | | |
|---|---|---|---|---|---|---|---|---|---|
| | Silicon | Copper | Manganese | Magnesium | Chromium | Nickel | Zinc | Titanium | Other |
| 2011 | | 5.5 | | | | | | | Lead and bismuth 0.40% each |
| 2014 | 0.8 | 4.4 | 0.8 | 0.50 | | | | | |
| 2017 | 0.50 | 4.0 | 0.7 | 0.6 | | | | | |
| 2018 | | 4.0 | | 0.7 | | 2.0 | | | |
| 2024 | | 4.4 | 0.6 | 1.5 | | | | | |
| 2025 | 0.8 | 4.4 | 0.8 | | | | | | |
| 2036 | | 2.6 | 0.25 | 0.45 | | | | | |
| 2117 | | 2.6 | | 0.35 | | | | | |
| 2124 | | 4.4 | 0.6 | 1.5 | | | | | |
| 2218 | | 4.0 | | 1.5 | | 2.0 | | | |
| 2219 | | 6.3 | 0.30 | | | | | 0.06 | vanadium 0.10% zirconium 0.18% |
| 2319 | | 6.3 | 0.30 | | | | | 0.15 | vanadium 0.10% zirconium 0.18% |
| 2618 | 0.18 | 2.3 | | 1.6 | | 1.0 | | 0.07 | iron 1.1% |
| 6003 | 0.7 | | | 1.2 | | | | | |
| 6005 | 0.8 | | | 0.50 | | | | | |
| 6053 | 0.7 | | | 1.2 | 0.25 | | | | |
| 6061 | 0.6 | 0.28 | | 1.0 | 0.20 | | | | |
| 6063 | 0.40 | | | 0.7 | | | | | |
| 6066 | 1.4 | 1.0 | 0.8 | 1.1 | | | | | |
| 6070 | 1.4 | 0.28 | 0.7 | 0.8 | | | | | |
| 6101 | 0.50 | | | 0.6 | | | | | |
| 6105 | 0.8 | | | 0.62 | | | | | |
| 6151 | 0.9 | | | 0.6 | 0.25 | | | | |
| 6162 | 0.6 | | | 0.9 | | | | | |
| 6201 | 0.7 | | | 0.8 | | | | | |
| 6253 | 0.7 | | | 1.2 | 0.25 | | 2.0 | | |
| 6262 | 0.6 | 0.28 | | 1.0 | 0.09 | | | | lead and bismuth 0.60% each |
| 6351 | 1.0 | | 0.6 | 0.6 | | | | | |
| 6463 | 0.40 | | | 0.7 | | | | | |
| 6951 | 0.35 | 0.28 | | 0.6 | | | | | |
| 7001 | | 2.1 | | 3.0 | 0.26 | | 7.4 | | |
| 7005 | | | 0.45 | 1.4 | 0.13 | | 4.5 | 0.04 | zirconium 0.14% |
| 7008 | | | | 1.0 | 0.18 | | 5.0 | | |
| 7011 | | | 0.20 | 1.3 | 0.12 | | 4.8 | | |
| 7072 | | | | | | | 1.0 | | |
| 7075 | | 1.6 | | 2.5 | 0.23 | | 5.6 | | |
| 7178 | | 2.0 | | 2.8 | 0.26 | | 6.8 | | |

DETAILED DESCRIPTION OF A PREFERRED EMBODIMENT

While the invention is described in connection with a preferred embodiment, it can be appreciated that it is not intended to limit the invention to this embodiment. On the contrary, it is intended to cover all alternatives, modifications and equivalents as may be included within the spirit and scope of the invention.

Figure 1:
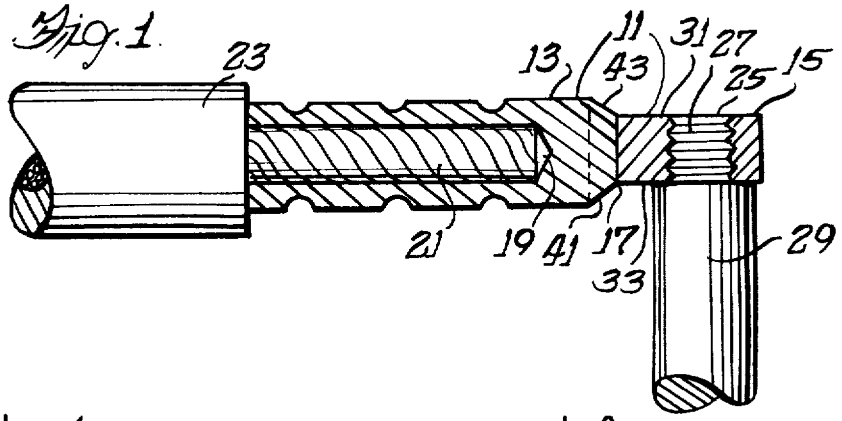
FIG. 1 is a side view in cross section of the one-piece, composite electrical connector showing a conductive portion of a conductor wire crimped in the cavity-containing end portion, and the threaded portion of a probe screwed into the hole-containing end portion.

In accordance with the invention, shown in FIG. 1 is a sideview, in cross-section, of one preferred form of the one-piece, composite electrical connector 11. The connector 11 comprises a crimpable end portion 13 and a mechanically connectable portion 15, where both of these portions have been integrally bonded together along an interface 17 employing a conventionally available bonding process outlined above in Example 1 and illustrated below in FIG. 7. The crimpable end portion 13 is shown containing a pre-machined cavity 19 into which a conductive portion 21 of a conductor wire 23 has been inserted. After being inserted into the cavity 19, the conductive portion 21 of the conductor wire 23 is held firmly in place in the cavity 19 by crimping the crimpable end portion 13 using commercially available crimping means. The mechanically connectable end portion 15 is shown containing a premachined, threaded hole 25 into which has been screwed a male, threaded end portion 27 of a probe 29.

The mechanically connectable end portion 15 has been shown having a pair of pre-machined flat faces 31 and 33, oriented substantially parallel to each other and to a generally longitudinal orientation of the composite connector 11. The flat faces 31 and 33 are not features essential to the overall novelty of the composite connector 11, but have herein been included to permit proper orientation of the pre-machined, threaded hole 25 so that the theaded end portion 27 of the probe 29 can be screwed readily therein.

Throughout the figures, like reference numerals refer to like parts.

Figure 2:
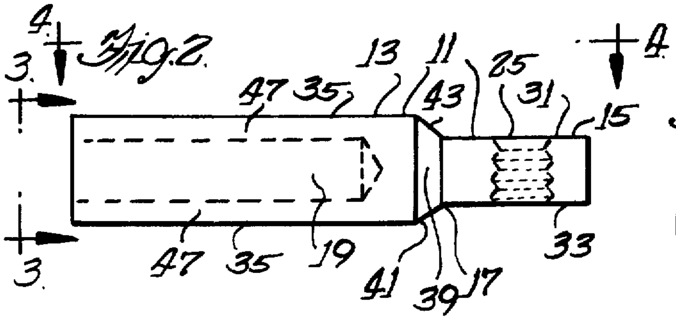
FIG. 2 is the side view of the one-piece, composite electrical connector of FIG. 1.

FIG. 2, the side-view of the preferred form of the one-piece, electrical composite connector of the present invention 11, illustrates that the cavity 19 is oriented substantially co-linear with the generally longitudinal orientation of the connector 11, and that the threaded hole 25 is oriented essentially transverse or perpendicular to the generally longitudinal orientation of the connector 11.

Also shown in FIG. 2 is an inclined flat face 43 which serves to blend the flat face 31 (of the mechanically connectable end portion 15) into the outer periphery 35 of the crimpable end portion 13. Another inclined flat face 41 similarly has been provided to blend the flat face 33 (of the mechanically connectable end portion 15) into the outer periphery 35 of the crimpable end portion 13. The rounded outer periphery 45 of the mechanically connectable end portion 15 has been shown generally blended into the rounded outer periphery 35 of the crimpable end portion 13 at the region 39.

Figure 3:
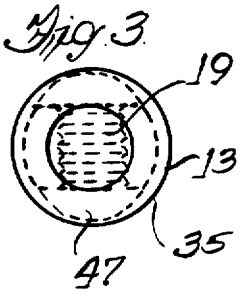
FIG. 3 is an end view of the cavity-containing, crimpable end portion, taken substantially in the plane of line 3—3 in FIG. 2.

FIG. 3, an end-view of the cavity 19 containing crimpable end portion 13, taken substantially in the plane of line 3—3 in FIG. 2, illustrates the substantially circular, cross sectional geometry of the cavity 19, the substantially circular, cross sectional geometry of the crimpable end portion 13, and the positioning of the cavity 19 relative to the crimpable end portion outer periphery 35. It is essential that an adequate amount of crimpable material 47, shown as an annulus in FIG. 3, be available for crimping purposes. FIG. 3 also presents the features of the mechanically connectable end portion 15 of the composite connector 11 (as dotted lines in the background) when viewing the composite connector 11 from the crimpable end portion 13. The substantially transverse or perpendicular orientation of the threaded hole 25 to the general orientation of the composite connector 11 and the substantially perpendicular orientation of the threaded hole 25 to the pre-machined flat faces 31 and 33, are shown as dotted lines.

Figure 4:
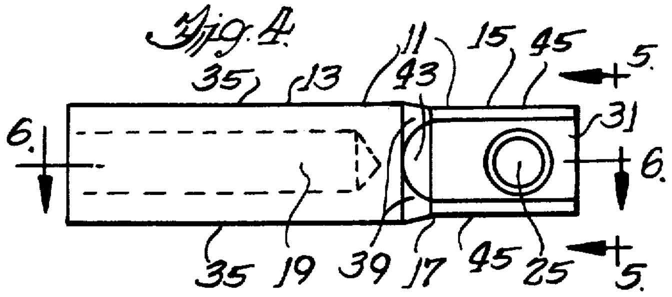
FIG. 4 is a top view taken substantially in the plane of line 4—4 in FIG. 2.
Figure 7:
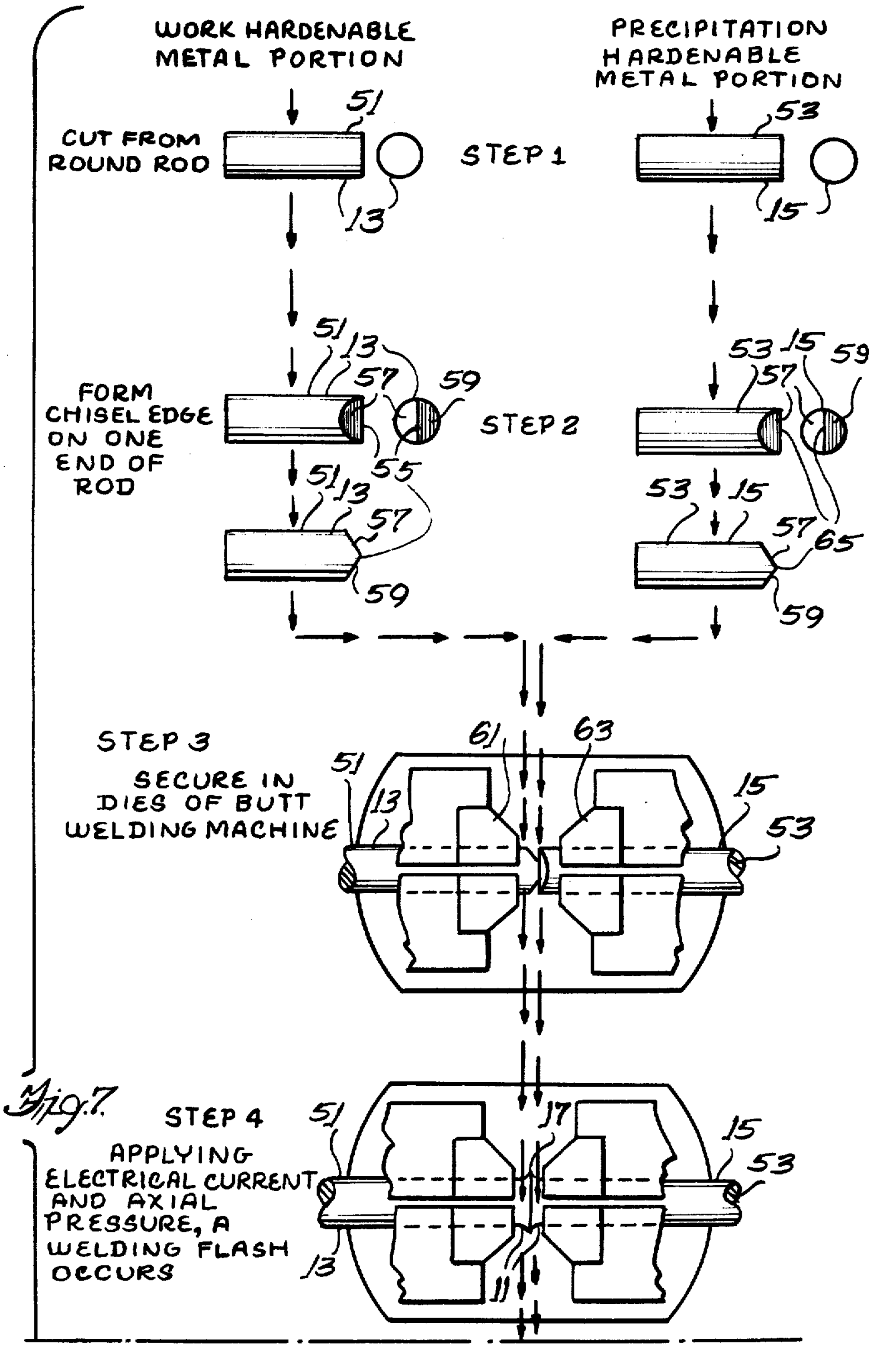
FIG. 7 is a manufacturing sequence illustrating certain of the various steps performed using the conventional process outlined above in the first working example of the one-piece, composite electrical connector of the present invention.

Turning now to FIG. 4, the outer periphery 45 of the mechanically connectable end portion 15 has been shown blended into the outer periphery 35 of the crimpable end portion 13 along the region 39. In FIG. 7, the crimpable end portion 13 is shown having been made from round rod 51 larger in diameter than the round rod 53 used to make the mechanically connectable end portion. The flat face 31 of the mechanically connectable end portion 15 is shown in FIG. 4 as being blended into the outer periphery 35 of the crimpable end portion 13 by the inclined flat face 43. The threaded hole 25 of the mechanically connectable end portion 15 is shown substantially perpendicular to the flat face 31 which has been machined onto the mechanically connectable end portion 15.

Figure 5:
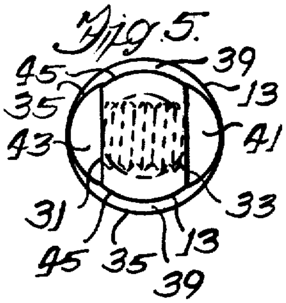
FIG. 5 is an end view of the hole-containing, mechanically connectable end portion, taken substantially in the plane of line 5—5 in FIG. 4.

FIG. 5 illustrate the blending of the outer periphery 45 of the mechanically connectable end portion 15 into the outer periphery 35 of the crimpable end portion 13 along the region 39. Also illustrative of the surface blending, is the on-edge view of the flat faces 31 and 33 of the mechanically connectable end portion 15 which is shown as being blended into the outer periphery of the crimpable end portion 13 along the inclined planes 43 and 41, respectively.

Since FIG. 5 is a view looking substantially longitudinally at the connector 11 from the mechanically connectable end portion 15. FIG. 5 shows (as dotted lines in the background) the co-linear orientation of the cavity 19 to such a longitudinal orientation of the connector 11, and the transverse or perpendicular orientation of the threaded hole 25.

Figure 6:
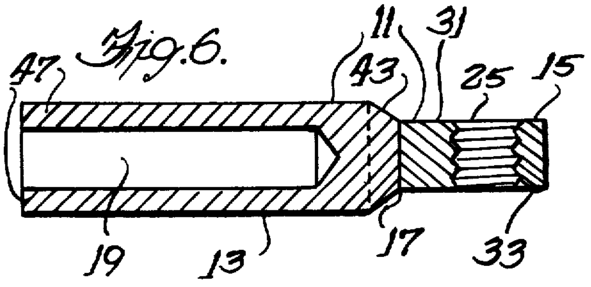
FIG. 6 is a cross-sectional view, taken substantially in the plane of line 6—6 in FIG. 4.

FIG. 6, a cross sectional view taken substantially along the line 6—6 in FIG. 4, shows what the connector 11 looks like (in cross section) before the mechanically connectable end 15 has had a threaded member (such as the probe 29) screwed into its hole 25 and before the annular section 47 has been crimped around a conductive portion 21 of conductor wire 23 (inserted into the cavity 19 of the crimpable end portion 13).

FIG. 7 illustrates, in 10 steps, the commercially available method of manufacturing the composite, one-piece electrical connector briefly outlined above in Example 1. This method comprised providing a work hardenable metal alloy cut from a round rod 51 to obtain a crimpable end portion 13, and providing a precipitation hardenable metal alloy also cut from a round rod 53 to obtain a mechanically connectable end portion 15 (step 1). Then, on one end of each of the pieces of round rod 51 and 53, a chisel edge 55 and 65 formed by chisel planes 57 and 59 is obtained using conventionally available machining tools (Step 2). Then, each of the pieces of round rod 51 and 53 is inserted into individual and opposing jaws 61 and 63 of a commercially available resistance butt welding machine. The pieces of round rod 51 and 53 are oriented in the jaws 61 and 63 in a substantially co-linear but opposite fashion such that each chisel edge 55 and 65 of each end portion of round rod 51 and 53 is touching but positioned such that one chisel edge 55 is perpendicular to the other chisel edge 65 (Step 3). Then, using the resistance butt welding machine and applying electrical current and axial pressure in a conventionally known manner, some metal melting and a welding flash occurs along the interface 17 between the crimpable end portion 13 and the mechanically connectable end portion 15, as the two end portions of round rod 51 and 53 are being joined together (Step 4). Then, using commercially available tooling, the welding flash is removed, flat faces 31 and 33 which are substantially parallel to each other and substantially perpendicular to the longitudinal orientation of the composite connector 11, are machined into the outer surface of the mechanically connectable end portion 15, and the crimpable end portion 13 round rod 51 outer surface is generally blended into the mechanically connectable end portion 15 round rod 53 outer surface (Step 5). Then, using commercially available tooling, the cylindrical cavity 19 is drilled into the crimpable end portion 13, the orientation of the cavity 19 being substantially co-linear with the orientation of the crimpable end portion 13 and extending far enough into the crimpable end portion 13 as needed to provide sufficient depth for effective securement after crimping (Step 6). Then, using commercially available tooling, a hole 67 substantially transverse or perpendicular to the connector 11 orientation and substantially perpendicular to the flat faces 31 and 33 is drilled into the mechanically connectable end portion 15 (Step 7); and thereafter, the threads 25 are machined therein (Step 8). Then, the entire connector 11 comprising the crimpable end portion 13 (which originally had been a portion of a work hardenable metal rod) and the mechanically connectable end portion 15 (which originally had been a portion of a precipitation hardenable metal rod) is subjected to a commercially available heat treating process, here being heated in an oven 69, to either soften the metal alloy of the crimpable end portion 13 or harden the metal alloy of the mechanically connectable end portion 15 or to do both (Step 9). Then, the mechanically connectable end portion 15 or the entire composite connector 11 can (optionally) be subjected to a commercially available tin-plating process; here, illustrating in FIG. 7, a process comprising a tin-plating vat 71 and a tin-plating solution 73, which when operated in a commercially known manner, cause tin to be plated only onto a portion of the composite connector 11; here being shown as being plated substantially into the inner threaded surface of the hole 25 of the mechanically connectable end portion 15 (Step 10).

I claim:

1. A one-piece, composite electrical connector fabricated from at least two portions of electrically conductive metal alloys, comprising at least a first one of said portions being a precipitation hardenable metal alloy which is thermally hardenable, and at least a second one of said portions being a work hardenable metal alloy which is thermally softenable, said first and second portions being joined together by a bond along an interface common to said first and second portions, said first and second portions each having more than about 87% by weight of aluminum as a compositional element thereof for substantially precluding formation at said interface of intermetallic compounds harmful to said bond, said first portion being suitable for mechanical connection and being selected from the group consisting of AA 2011, AA 2014, AA 2017, AA 2018, AA 2024, AA 2025, AA 2036, AA 2117, AA 2124, AA 2218, AA 2219, AA 2319, AA 2618, AA 6003, AA 6005, AA 6053, AA 6061, AA 6063, AA 6066, AA 6070, AA 6101, AA 6105, AA 6151, AA 6162, AA 6201, AA 6253, AA 6262, AA 6351, AA 6463, AA 6951, AA 7001, AA 7005, AA 7008, AA 7011, AA 7072, AA 7075, and AA 7178, said second portion being crimpable and being selected from the group consisting of AA 1050, AA 1060, AA 1100, AA 1145, AA 1175, AA 1200, AA 1230, AA 1235, AA 1345, AA 1350, AA 3003, AA 3004, AA 3005, AA 3105.

2. A one-piece, composite electrical connector fabricated from at least two portions of electrically conductive metal alloys, comprising at least a first one of said portions being a precipitation hardenable metal alloy which is thermally hardenable, and at least a second one of said portions being a work hardenable metal alloy which is thermally softenable, said first and second portions being joined together by a bond along an interface common to said first and second portions, said first and second portions each having more than about 90% by weight of aluminum as a compositional element thereof for substantially precluding formation at said interface of intermetallic compounds harmful to said bond, said first portion being suitable for mechanical connection, said second portion being crimpable.

3. The electrical connector of claim 2 wherein said first portion is made of AA 356.0; and wherein said second portion is made of AA 100.1.

4. The electrical connector of claim 2 wherein said first portion is made of AA 7075; and wherein said second portion is made of AA 1060.

5. A one-piece, composite electrical connector fabricated from at least two portions of electrically conductive metal alloy, comprising at least a first one of said portions being a precipitation hardenable metal alloy which is thermally hardenable, and at least a second one of said portions being a work hardenable metal alloy which is thermally softenable, said first and second portions being joined together by a bond along an interface common to said first and second portions, said first and second portions each having more than about 97% by weight of aluminum as a compositional element thereof for substantially precluding formation at said interface of intermetallic compounds harmful to said bond, said first portion being suitable for mechanical connection, said second portion being crimpable.

6. The electrical connector of claim 5 wherein said first portion is made of AA 6061; and wherein said second portion is made of AA 1100.

7. The electrical connector of claim 5 wherein said first portion is made of AA 6061-T6; and wherein said second portion is made of AA 1100-0.

8. The electrical connector of claim 5 wherein said first portion is made of AA 6061-T6; and wherein said second portion is made of AA 1100-H18.

9. A one-piece, composite electrical connector fabricated from at least two portions of electrically conductive metal alloys, comprising at least a first one of said portions being a precipitation hardenable metal alloy which is thermally hardenable, and at least a second one of said portions being a work hardenable metal alloy which is thermally softenable, said first and second portions being joined together by a bond along an interface common to said first and second portions, said first and second portions each having more than about 63% by weight of nickel as a compositional element thereof for substantially precluding formation at said interface of intermetallic compounds harmful to said bond, said first portion being suitable for mechanical connection, said second portion being crimpable.

10. The electrical connector of claim 9 wherein said first portion is made of Monel Alloy K500; and wherein said second portion is made of Nickel 200.

11. A one-piece, composite electrical connector fabricated from at least two portions of electrically conductive metal alloys, comprising at least a first one of said portions being a precipitation hardenable metal alloy which is thermally hardenable, and at least a second one of said portions being a work hardenable metal alloy which is thermally softenable, said first and second portions being joined together by a bond along an interface common to said first and second portions, said first and second portions having more than about 95% by weight respectively of copper and of nickel as major compositional elements thereof for substantially precluding formation at said interface of intermetallic compounds harmful to said bond, said first portion being suitable for mechanical connection, said second portion being crimpable.

12. The electrical connector of claim 11 wherein said first portion is made of CDA 647; and wherein said second portion is made of Nickel 200.

13. A one-piece, composite electrical connector fabricated from at least two portions of electrically conductive metal alloys, comprising at least a first one of said portions being a precipitation hardenable metal alloy which is thermally hardenable, and at least a second one of said portions being a work hardenable metal alloy which is thermally softenable, said first and second portions being joined together by a bond along an interface common to said first and second portions, said first and second portions each having more than about 95% by weight of copper as a compositional elements thereof for substantially precluding formation at said interface of of intermetallic compounds harmful to said bond, said first portion being suitable for mechanical connection, said second portion being crimpable, said second portion being made of CDA 102, said first portion being made of CDA 647.

14. A one-piece, composite electrical connector fabricated from at least two portions of electrically conductive metal alloys, comprising at least a first one of said portions being a precipitation hardenable metal alloy which is thermally hardenable, and at least a second one of said portions being a work hardenable metal alloy which is thermally softenable, said first and second portions being joined together by a bond along an interface common to said first and second portions, said first and second portions each having more than about 95% by weight of copper as a compositional element thereof for substantially precluding formation at said interface of intermetallic compounds harmful to said bond, said first portion being suitable for mechanical connection, said second portion being crimpable, said second portion being made of CDA 102, said first portion being made of CDA 182.

15. A one-piece, composite electrical connector fabricated from at least two portions of electrically conductive metal alloys, comprising at least a first one of said portions being a precipitation hardenable metal alloy which is thermally hardenable, and at least a second one of said portions being a work hardenable metal alloy which is thermally softenable, said first and second portions being joined together by a bond along an interface common to said first and second portions, said first and second portions having more than about 74% by weight of copper as a compositional element thereof for substantially precluding formation at said interface of intermetallic compounds harmful to said bond, said first portion being suitable for mechanical connection, said second portion being crimpable, said second portion being made of CDA 801, said first portion being made of CDA 955.

* * * * *